United States Patent [19]

Kishi et al.

[11] Patent Number: 4,706,000
[45] Date of Patent: Nov. 10, 1987

[54] TOOL POSTURE CONTROL SYSTEM

[75] Inventors: Hajimu Kishi, Hino; Shinsuke Sakakibara, Komae; Haruyuki Ishikawa, Tokyo; Yuuichi Kanda, Hino, all of Japan

[73] Assignee: Fanuc Ltd., Minamitsuru, Japan

[21] Appl. No.: 860,192

[22] PCT Filed: Aug. 21, 1985

[86] PCT No.: PCT/JP85/00462
§ 371 Date: Apr. 24, 1986
§ 102(e) Date: Apr. 24, 1986

[87] PCT Pub. No.: WO86/01617
PCT Pub. Date: Mar. 13, 1986

[30] Foreign Application Priority Data

Aug. 24, 1984 [JP] Japan ................................. 59-175154

[51] Int. Cl.[4] .............................................. G05B 19/42
[52] U.S. Cl. ....................................... 318/568; 318/632
[58] Field of Search .................... 318/568 E, 568, 632

[56] References Cited

U.S. PATENT DOCUMENTS 4,528,632 7/1985 Nio et al. ............................. 364/169
4,575,802 3/1986 Walsh et al. ........................ 364/513

OTHER PUBLICATIONS

"Classical Mechanics" Herbert Goldstein, Addison-Wesley Publishing Co. 1950, pp. 97-101.

Primary Examiner—William M. Shoop, Jr.
Assistant Examiner—Saul M. Bergmann
Attorney, Agent, or Firm—Staas & Halsey

[57] ABSTRACT

A tool posture control system according to the present invention rotates a tool vector $v_1$ indicative of a present tool position to a target tool vector $v^1$ through vector rotation, and generates data for driving robot axes from the data produced by the vector rotation. For a welding robot, for example, the inclination of a torch with respect to an arc starting surface can automatically and appropriately be established, so that an arc starting point can accurately be searched for. Therefore, the operation to search for a desired arc starting point can properly be carried out without human intervention.

3 Claims, 6 Drawing Figures

TOOL POSTURE CONTROL SYSTEM

DESCRIPTION

BACKGROUND OF THE INVENTION

The present invention relates to a tool posture control system, and more particularly to a system for controlling the posture of a tool while searching for an arc starting point by controlling the posture vector of the searching posture of the tool using a tool coordinate system, and by tilting the tool in a certain direction in a searching coordinate space for thereby seaching for the arc starting point.

Industrial robots have found widespread use and are being used in many fields in recent years. In welding technology, welding operations are getting too difficult for human beings to perform, and the working environments such as for automobile production lines are more likely to be hard on workers. For these reasons, human operations are being replaced with welding robots.

FIG. 4 of the accompanying drawings shows a general welding robot. The illustrated welding robot is an articulated robot having six axes. These six axes include a T($\theta$)-axis about which an arm assembly rotates, a W-axis about which a lower arm is tilted back and forth, a U-axis about which an upper arm is tilted vertically, an A-axis about which a wrist rotates in a horizontal plane, a B-axis about which the wrist moves in a vertical plane, and a C(r)-axis about which the wrist rolls, these axes being independently controlled. Designated at 1 in FIG. 4 is a base on which the articulated robot is supported. A T($\theta$)-axis servo motor 2 is mounted in the base 1 for turning the axes about the vertical axis (Z-axis). On the T($\theta$)-axis servo motor 2, there is mounted a T($\theta$)-axis unit 3 rotated by the servo motor 2. A W-axis unit 4 is fixedly mounted on the T($\theta$)-axis unit 3, and a W-axis arm 5 is rotatably supported by a pivot shaft 5a on the W-axis unit 4, the W-axis arm 5 being operated by a W-axis drive mechanism 6. A U-axis arm 7 is rotatably supported by a pivot shaft 7a on the distal end of the W-axis arm 5, the U-axis arm 7 being operated by a U-axis drive mechanism 8. A wrist mechanism 9 is mounted on the distal end of the U-axis arm 7. The wrist mechanism 9 is rotated by an A-axis servo motor 10, vertically swung by a B-axis servo motor 11, and rolled by a C-axis servo motor 12. Robot operation is performed by a tool attached to the wrist mechanism 9. A torch used as such a tool and an arc welding process employing the torch will be described. FIG. 5 schematically shows an arc welding machine. A wire WR is fed by rollers FR in small increments in the direction of the arrow, and passes through a guide member GB to project from the distal end of a torch TC. The rate of feed of the wire WR is limited such that the distal end of the wire will be spaced a prescribed distance from the surface of a member WK to be welded. The positive potential of a high voltage which is generated by a welding power supply PS intermittently with a given period is applied to the wire WR through the guide member GB, whereas a negative potential is impressed on the member WK to be welded. A gas is supplied from a gas supply (not shown) in the direction of the arrows through the torch TC and applied to the member WK to prevent a welded area from being oxidized. When the gas is supplied from the gas supply and the high voltage is intermittently generated by the welding power supply PS while the wire is fed out in small increments, an arc is produced from the distal end of the wire, and the wire and the member to be welded are melted such that the melted portion is integrally welded. Such a welding operation is performed by the robot. More specifically, the torch of the welding machine is gripped by the robot, and the torch (distal end of the wire) is moved by the robot along a welding path to weld the desired portion.

When the member to be welded is set in place for the welding operation, the torch is moved with respect to the member to be welded to search for an arc starting point while manually searching for the position of the member to be welded.

For determining the tool position, there are employed a robot reference coordinate system, a robot hand coordinate system, and a tool coordinate system. FIG. 6 is a diagram explanatory of such robot, hand, and tool coordinate systems. The robot reference coordinate system is indicated by $\underline{x}$, $\underline{y}$, $\underline{z}$ with O denoting the origin. Designated at $\underline{l}$, $\underline{m}$, $\underline{n}$ are hand posture vectors in the robot hand coordinate system, while designated at $\underline{t}$, $\underline{u}$, $\underline{v}$ are tool posture vectors in the tool coordinate system. Denoted at TCP is a tool center point (also referred to as a tool grip point).

Prior to starting arc welding, as described above, it is necessary to search for an arc-welding starting point. The arc starting point cannot accurately be spotted and the desired operation to search for the arc starting point cannot be effected unless the posture of the torch is appropriately controlled.

SUMMARY OF THE INVENTION

It is an object of the present invention to provide a tool posture control system capable of desirably searching for an arc starting point by automatically establishing the best posture of a working member to search for the position of a member to be welded.

A tool posture control system according to the present invention has a robot having an arm, a tool mounted on the distal end of the arm, principal vector setting means for determining the principal position of the robot, means for determining a tool vector indicative of the present position of the tool, means for determining a target tool vector inclined with respect to the principal vector, rotating means for rotating the tool vector indicative of the present position of the tool to the target tool vector through vector rotation, means for generating data for driving the axes of the robot from data produced by rotating the tool vector indicating the present position with the rotating means, and for moving the tool to the position of the target tool vector.

Where the present invention thus arranged as above is applied to a welding robot, for example, the torch as the tool can automatically be set to a position having the best inclination when it is initially established. Since an arc starting point can thus be searched for accurately, the desired operation for searching for the arc starting point can properly be performed without human intervention.

DESCRIPTION OF THE PREFERRED EMBODIMENTS

An embodiment of the present invention will hereinafter be described in specific detail with reference to the drawings.

Figure 1:
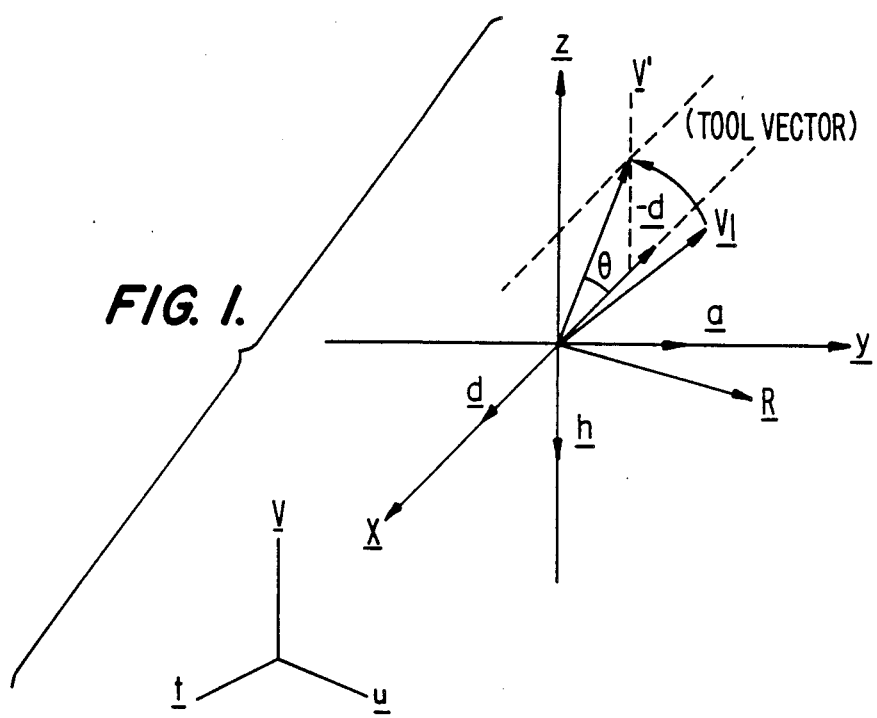
FIG. 1 is a diagram explaining the manner in which a tool posture vector is controlled in a searching coordinate space.
Figure 2:
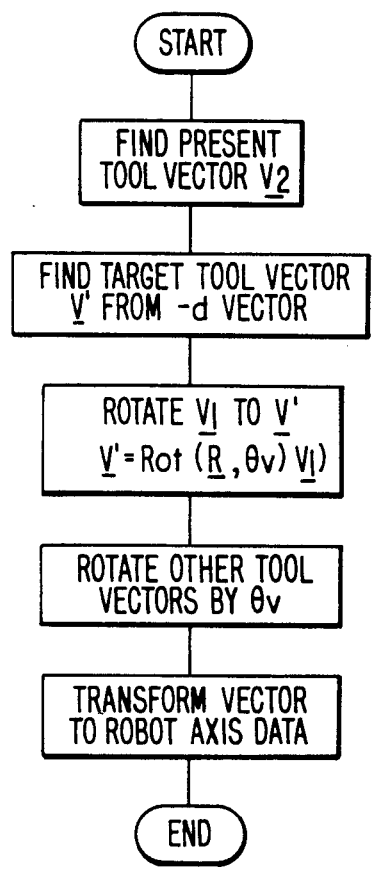
FIG. 2 is a flowchart of operation of means for controlling the tool posture vector.

FIG. 1 is explanatory of the control of the tool posture vector of a torch in a searching coordinate space, i.e., a coordinate space with a member to be welded being used as a reference, where the underlining of a letter indicates a vector. FIG. 2 is a flowchart of the control sequence. Principal vectors in the searching coordinate space are indicated as $\underline{d}$ (x direction), $\underline{a}$ (y direction), and $\underline{h}$ (-z direction). Designated at $\underline{t}$, $\underline{u}$, $\underline{v}$ principal vectors in the tool coordinate space.

Searching posture directions for the tool are determined by angles between the principal vectors $\underline{d}$, $\underline{a}$, $\underline{h}$ in the searching coordinate space and the three fundamental $\underline{t}$, $\underline{u}$, $\underline{v}$.

Since the searching directions are fixed, the tool posture vectors are simplified, and the searching directions are easy to compute.

A process of controlling the searching posture of the tool at the time of searching for an arc starting point will be described below.

A present tool vector $\underline{v}$, is first determined.

In order to transform the tool vector $\underline{v}_1$ into the searching coordinate space, a target tool vector $\underline{v}'$ is established with respect to each of the principal vectors $\underline{d}$, $\underline{a}$, $\underline{h}$ in the searching coordinate space. Specifically, (1) The target tool vector $\underline{v}'$ is determined with respect to the vector $-\underline{d}$ which is one of the principal vectors in the searching coordinate space. This tool vector $\underline{v}'$ is inclined $\theta$ from the principal vector $-\underline{d}$, the angle $\theta$ being preset to an optimum value.

(2) Then, the target tool vector is determined with respect to the vector $\underline{a}$ that is one of the principal vectors in the searching coordinate space.

(3) Thereafter, the target tool vector is determined with respect to the vector $\underline{h}$ that is one of the principal vectors in the searching coordinate space.

When transforming the present tool vector $\underline{v}_1$ into the searching coordinate system, the present tool vector $\underline{v}_1$ is rotated to the target tool vector $\underline{v}'$. This is expressed by:

$$\underline{v}' + \text{Rot}(\underline{R}, \Theta v)\underline{v}_1$$

where Rot indicates rotation, $\underline{R}$ is the center of rotation, and $\theta v$ is the angle of rotation.

The present tool vector $\underline{v}_1$ has thus been transformed into the searching coordinate system, and a tool posture vector is now obtained.

The transformed tool posture vector is then transformed to a robot hand posture vector, i.e., can be transformed to robot axis data. More specifically, normal and inverse transformation can be possible at all times between the hand posture vectors $\underline{l}$, $\underline{m}$, $\underline{n}$ and the fundamental axes $\underline{t}$, $\underline{u}$, $\underline{v}$ in the tool coordinate system. This is because the hand coordinate system and the tool coordinate system are always in fixed relative spatial positions, and hence the following equations can be established through one 3×3 fixed matrix (M):

$$\begin{pmatrix} t_x & u_x & v_x \\ t_y & u_y & v_y \\ t_z & u_z & v_z \end{pmatrix} = \begin{pmatrix} l_x & m_x & n_x \\ l_y & m_y & n_y \\ l_z & m_z & n_z \end{pmatrix} \times (M)$$

$$\parallel \parallel \parallel \qquad \parallel \parallel \parallel$$
$$\underline{t} \ \underline{u} \ \underline{v} \qquad \underline{l} \ \underline{m} \ \underline{n}$$

$$\begin{pmatrix} l_x & m_x & n_x \\ l_y & m_y & n_y \\ l_z & m_z & n_z \end{pmatrix} = \begin{pmatrix} t_x & u_x & v_x \\ t_y & u_y & v_y \\ t_z & u_z & v_z \end{pmatrix} \times T_{(M)}$$

To determine (M), metric values for the axes of the robot are used as setting data, and hand posture vectors $\underline{l}_o$, $\underline{m}_o$, $\underline{n}_o$ at this time can be derived from these values. Assuming that $$\underline{l}_o, \underline{m}_o, \underline{n}_o = T_{(M)}$$

transformation can easily be performed between hand posture vectors $\underline{l}$, $\underline{m}$, $\underline{n}$ and the fundamental axes $\underline{t}$, $\underline{u}$, $\underline{v}$ in the tool coordinate system. In this manner, the torch serving as the tool can approach a given searching surface at a desired angle, with the result that an accurate arc starting point can be searched for.

Actual control of the searching posture of a tool with respect to an L-shaped member to be welded, using the process of controlling the posture of the torch as the tool, will be described below.

Figure 3:
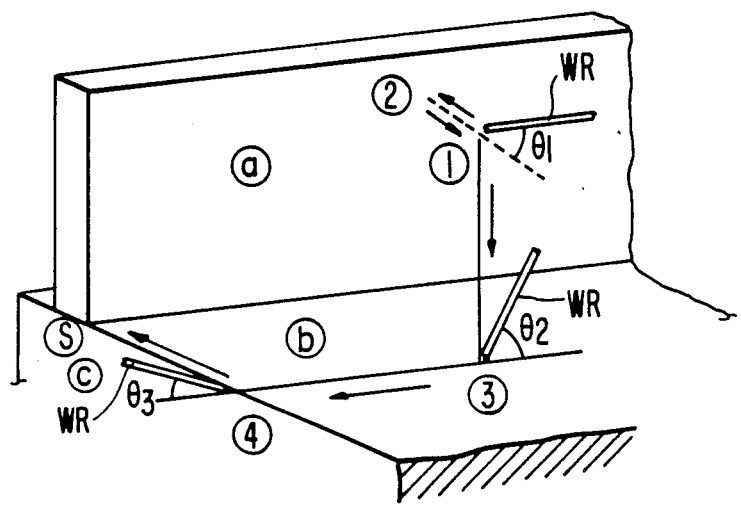
FIG. 3 is a view showing an example to which a process of controlling the tool posture vector is applied.
Figure 5:
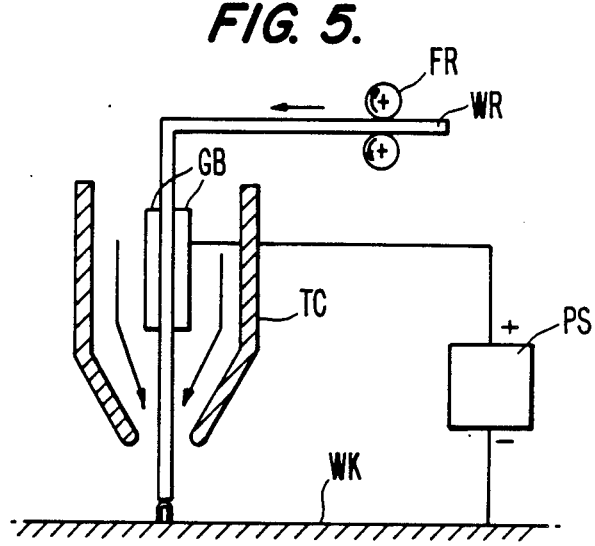
FIG. 5 is a schematic view of an arc welding machine.
Figure 6:
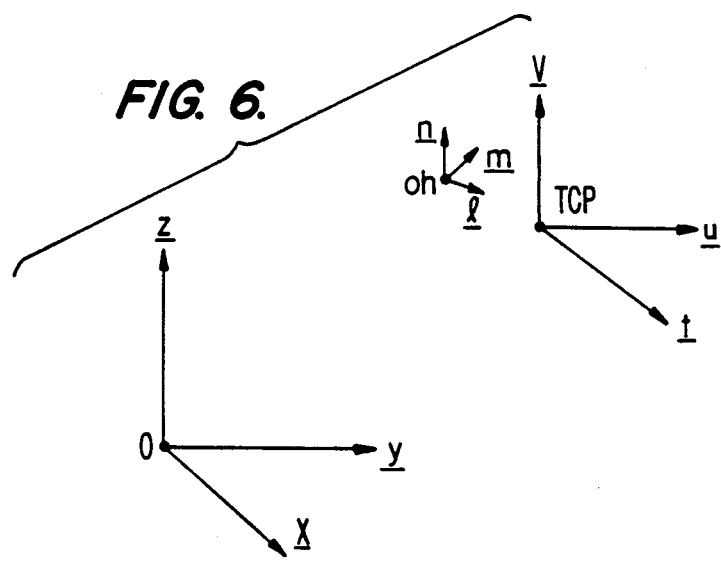
FIG. 6 is a diagram explaining a robot coordinate system and a tool coordinate system.
Figure 4:
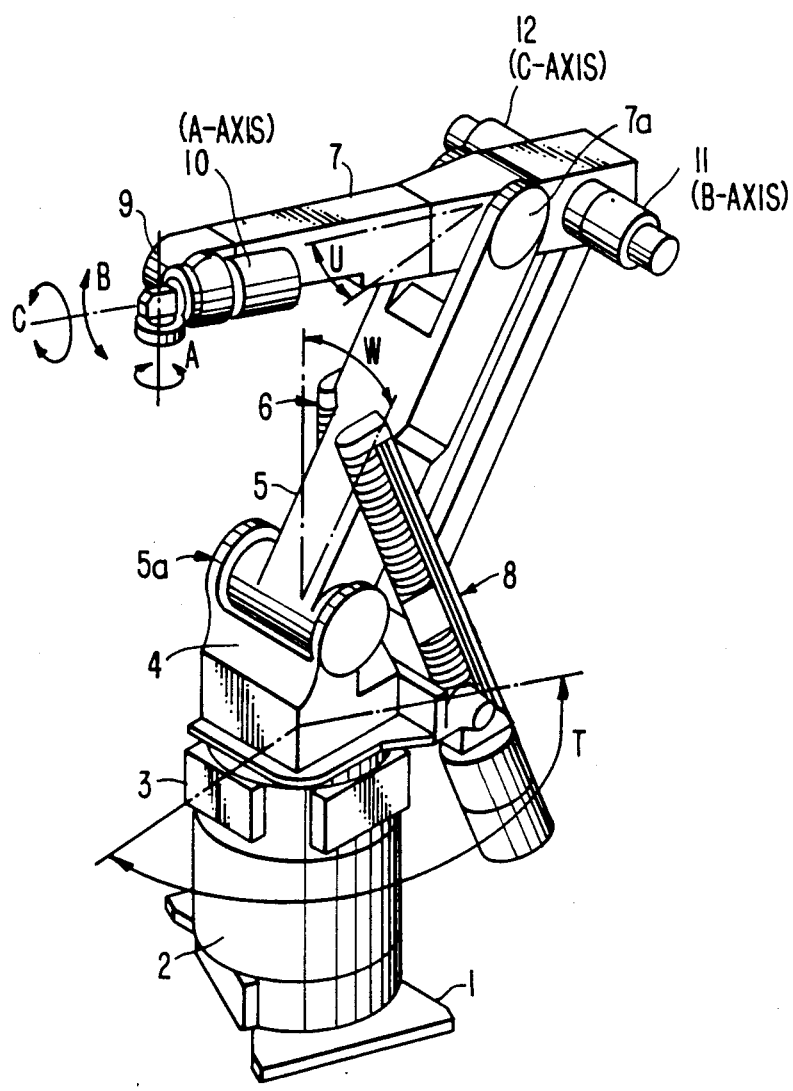
FIG. 4 is a view of a general welding robot.

FIG. 3 is a view illustrative of such control of the searching posture of the torch.

It is assumed that the torch (distal end of the wire) TC as the tool is located at the position ① and inclined at any angle. The above-described tool posture control is effected in this position to cause the torch TC to be inclined at $\theta_1$ with respect to a line perpendicular to a side surface ⓐ. From this position, the torch TC moves in a searching manner toward the side surface ⓐ of a vertical plate of the L-shaped member until the torch TC contacts the side surface a at a position ②. Then, the torch TC returns to the initial position ①, wherein the torch posture control is carried out to direct the torch TC to be inclined at $\theta_2$ with respect to the upper surface ⓑ of a horizontal plate of the L-shaped member. Thereafter, the torch TC is lowered until it contacts the upper surface b at a position ③. In the position ③, the torch TC is controlled in its posture again so to be inclined at $\theta_3$, and then the torch TC is moved in a searching manner toward a side edge of the horizontal plate of the L-shaped member. When the torch TC reaches the edge ④, the foregoing torch posture control is performed again to move the torch TC toward an arc starting point S.

It should be understood that the present invention is not limited to the above embodiment, but many changes and modifications may be made therein without departing from the scope of the present invention.

The present invention is not limited to welding robot applications, but may suitably be employed for controlling the posture of other articulated robots.

What is claimed is:

1. A tool posture control system, comprising:
   a robot having an arm;
   a tool mounted on the distal end of the arm;
   principal vector setting means for determining a position of the robot in a robot coordinate system;

means for determining a tool vector indicative of the present position of the tool in a tool coordinate system;

means for determining a target tool vector inclined with respect to a principal vector in a searching coordinate system;

rotating means for rotating the tool vector indicative of the present position of the tool to the target tool vector through vector rotation; and means for generating data for driving the axes of the robot from data produced by rotating the tool vector indicating the present position with said rotating means to move the tool to the target vector position by transforming the tool vector from the tool coordinate system, to the searching coordinate system and to the robot coordinate system.

2. A tool posture control system according to claim 1, wherein said tool comprises a welding torch of a welding robot.

3. A tool posture control system according to claim 1, wherein said robot comprises an articulated robot having a plurality of articulations.

* * * * *